United States Patent [19]

Croughwell

[11] E Re. 29,188

[45] Reissued Apr. 19, 1977

[54] COMPUTER CONTROL FOR GLASSWARE FORMING MACHINE

[75] Inventor: William J. Croughwell, Wilmington, N.C.

[73] Assignee: Emhart Industries, Inc., Hartford, Conn.

[22] Filed: Dec. 18, 1975

[21] Appl. No.: 626,286

Related U.S. Patent Documents

Reissue of:

[64] Patent No.: 3,905,793
Issued: Sept. 16, 1975
Appl. No.: 516,424
Filed: Oct. 21, 1974

[52] U.S. Cl. ..... 65/163; 65/161; 65/164; 65/DIG. 13; 235/151.1

[51] Int. Cl.[2] ..... C03B 7/00; C03B 9/18; C03B 9/40

[58] Field of Search ..... 65/163, 164, 161, DIG. 13; 178/5–6; 235/151, 151.1

[56] References Cited

UNITED STATES PATENTS

| | | | |
|---|---|---|---|
| 3,039,687 | 6/1962 | Chope | 235/151 |
| 3,305,341 | 2/1967 | Mumford | 65/164 X |
| 3,574,587 | 4/1971 | Grundy et al. | 65/164 X |
| 3,762,907 | 10/1973 | Quinn et al. | 65/163 X |
| 3,957,477 | 5/1976 | Jones et al | 65/164 X |

*Primary Examiner*—Arthur D. Kellogg
*Attorney, Agent, or Firm*—McCormick, Paulding & Huber

[57] ABSTRACT

A control system for operation of the individual sections of a glassware forming machine includes a shaft position encoder associated with the mechanical drive for the feeder, and a digital computer for programming various events in the machine cycle in accordance with certain boundary event timings. The shaft encoder output is converted to binary coded decimal (BCD) form and is fed to the digital computer through a priority program which permits routine starting and stopping of the machine and its various sections, and which also includes manual means for setting up the desired cycle of operation for the various mechanisms associated with a given section and for later transferring these settings to the other sections of the machine with operation of each section being phase delayed in accordance with a predetermined "firing order". These settings can be revised during operation of the machine as a result of the program stored in the digital computer. In addition, limits may be imposed upon the revisions which will be permitted.

10 Claims, 9 Drawing Figures

COMPUTER CONTROL FOR GLASSWARE FORMING MACHINE

Matter enclosed in heavy brackets [ ] appears in the original patent but forms no part of this reissue specification; matter printed in italics indicates the additions made by reissue.

BACKGROUND OF THE INVENTION

The invention disclosed herein represents an improvement over that shown and described in a prior co-pending application entitled "Control System For Glassware Machine" in the names of Mylchreest and Wythe filed June 29, 1973 under Ser. No. 374,818.

As disclosed in the above mentioned patent application the normal cycle of a typical individual section glassware forming machine can be rendered more versatile by dividing its cycle up into modes related to the thermodynamics of the dynamic glassware forming process. More particularly, these modes are defined by boundary event timings which can be related to certain key mechanical functions, and a computer is disclosed for use in controlling certain other machine functions within a particular mode. These boundary event timings not only control other event timings within a particular mode, but are variable within predetermined limits. However, the above mentioned patent application suggests use of a pulse generator to trigger a counter to develop discrete counts for use by a comparator wherein these counts are compared to desired values stored in memory. An output from this comparison operates a solenoid controlled valve block which is analagous to the mechanically actuated valve block in the conventional pneumatically operated type of glassware machine.

As disclosed in the present application a shaft encoding device is adapted to provide a voltage signal indicative of the angular position of a shaft associated with the mechanical drive for the feeder itself, and this shaft encoder signal is converted to binary coded decimal (BCD) form in order to permit use of a digital computer for carrying out the comparison concept disclosed in the above mentioned co-pending patent application. As a result of the improved system disclosed herein the need for a counter is obviated.

Among the prior art approaches to adapting the typical Hartford I. S. type of glassware forming machine to electronic control is the system disclosed in U.S. Pat. No. 3,762,907 issued to Quinn et al Oct. 2, 1973. This prior art patent provides a pulse generator for producing a series of pulses proportional in frequency to the rotational speed of the take-away conveyor drive shaft. A master counter, and associated gate circuitry, provide timed signals to the various machine sections. Still further counter circuitry is associated with each of the individual machine sections for actually operating the glassware forming mechanisms. This additional circuitry includes individual section counter means and associated switch gating to permit sequential operation of solenoid valves associated with the various mechanisms of each of the individual machine sections. A major disadvantage incident to the adoption of this disclosure in the environment of a typical glassware forming machine resides in the considerable expense involved in providing hard-wire electronic circuitry for the control of each of the various sections in a typical six or eight section Hartford I. S. type of machine. The present invention adopts a digital computer in the control system to be described herein, eliminating much of the complex electronic circuitry provided in this prior art disclosure, and as a consequence of the versatility inherent in such digital computers, the present invention has the additional advantage of permitting changes to the timing of the various mechanical mechanisms under the supervisory control of a program stored in such digital computer.

The advantages of the present invention can best be delineated by reference to the conventional cycle of operation of the Hartford I. S. machine. However, the description to follow defines this cycle by reference to certain boundaries which relate the thermodynamics of the glassware forming process to the mechanical machine functions normally provided in the conventional machine. These boundaries permit the use of a computer or controller to be so programmed that the machine operator can manually alter these boundaries by predetermined increments to vary machine operation and to improve the machine's efficiency at the press of button, the related machine functions being automatically revised as required in accordance with the program, and the selected change being automatically cancelled if any of these functions will be outside of predetermined limits.

In a typical Hartford I. S. type of glassware forming machine, molten glass gobs are delivered, by means of a gob distribution system, in a predetermined sequency to the upwardly open blank *molds* of the various machine sections. Each section comprises a self-contained unit which includes a blank mold station and a blow mold station. The gob of molten glass is formed into a parison at the blank station, and then transferred to the blow station by a neck ring arm which includes a neck mold. The neck mold not only mates with the blank mold at the blank station but also serves to support the parison during transfer to the blow station.

The blank mold may be of the split or the solid type but in the description to follow a two part split blank mold is provided, and is adapted to mate with the neck mold. The neck mold is also of the split type, and is annular in shape with a central opening to receive a vertically reciprocable plunger which presses the gob upwardly into the blank mold in the "press and blow" process, or which plunger is associated with a thimble to permit the parison to be formed by the "blow and blow" process. This latter process provides for "counter blow" air at the blank station in addition to the "final blow" air at the blow station. The description to follow contemplates forming glassware by a blow and blow process, but could also be adapted for use in the press and blow process.

The glass gobs are formed at rate determined by the machine operator, and these gobs are fed through a distribution system to the various blank mold cavities. Each blank cavity is upwardly open, and a funnel is usually provided to move in onto the closed blank mold for guiding the gob into such cavity. The gob drops through the funnel, into the cavity, and into the neck mold, which is always closed except for a short time at the blow station for release of the parison. In this "delivery mode" of the machine the plunger and the thimble must be raised to define the neck opening of the ware. This initial mode is synchronized with the gob distributor system.

The next mode of operation of the machine can be characterized as one of "settling" the gob or charge into the neck mold to form the finish of the ware. This is accomplished in the usual blow and blow process by bringing a baffle down onto the funnel, and providing air to the baffle for settling the charge in the blank mold. If no funnel is used in loading the gob, the baffle may move directly in on top of the blank mold. As so configured the blank station of the machine section is in its "parison settle" mode. After settle blowing has been completed the baffle, and funnel, are returned to their inactive positions, respectively.

The next mode of operation of the machine occupies only a short time, and can be characterized as "parison corkage reheat". The plunger moves downwardly away from the neck of the parison allowing the heat of the glass to stabilze in this part of the parison. This short pause softens the inside glass surface by internal conduction, at least in the area where the plunger tip has caused it to cool during the "delivery" and settle modes, and as so configured the machine is in its "corkage reheat" mode.

The next mode of operation of the machine can be characterized as one of parison forming, and in the blow and blow process such forming is carried out by increasing counter blow air to the softened area of the parison. The mechanical machine configuration is only altered from the previous mode in that the baffle is lowered onto the blank mold. This mode will see the gob expanded to fill the upper regions of the blank cavity defined by the blank mold and by the baffle. After allowing time for this preliminary forming the counter blow air is turned off, the baffle is returned to its inactive position, and the split blank mold is ready for opening. As so configured the blank station of the machine is still in its parison forming or counter blow mode.

The next mode involves reheating the parison and the initial phase is accomplished simply by opening the split blank mold. With the blank mold open the parison is not in contact with any mold parts except the neck mold. This configuration allows the heat stored in the thick walled parison to raise the temperature of its surfaces, hence the derivation of the term reheat mode. This phase can be called blank side reheat.

After the blank mold has completely opened, the neck ring arm inverts the neck mold and the parison along with it. This phase of the reheat mode can be characterized, thermodynamically, as "invert reheat". As the parison reaches the blow station the third phase of reheat starts as "low side reheat". The blow mold closes around the parison and around a bottom plate, which will be spaced below that end of the parison opposite its neck or open end. The blow mold has an upper portion which supports the parison from just below its finish, allowing the neck mold to be opened prior to revert, or return movement of the neck ring mold. The neck ring mold recloses during return movement so that the blank mold can close around it once the neck mold has returned to the blank station.

The next mode involves final forming of the body of the ware, the finish of the ware having been formed by the neck mold at the blank station. The final blow air is delivered to the interior of the parison by a blow head which moves down onto the top of the closed blow mold. After a preset time for final blowing the air is turned off and the blow head returned to its inactive position. At the end of the final blow mode, the blow mold opens and take-out tongs (open) are swung into the blow station starting the take-out mode. The tongs close around the newly formed ware and the article is lifted off the bottom plate for delivery to the deadplate portion of a take-away conveyor system.

The concept of dividing the cycle of operation of a glassware forming machine into various modes associated with a particular section, as referred to above, is shown and described in the above mentioned co-pending patent application. However, in said co-pending patent application, counter means is required as an adjunct to the use of a pulse generator in order to provide the requisit control of the various mechanical mechanisms or means associated with each machine section. As disclosed therein a pulse generator is used to trigger counter means, which develops counts for use by gate or comparator circuitry in order to produce an output signal suitable for operating a solenoid controlled valve block. Although the prior co-pending application discloses two types of channels for handling the information, one channel comprising a boundary channel and the other type of channel comprising a preset count determined by the boundary channel value, it will be apparent from the description to follow that the present disclosure relates to a control system for a glassware *forming* machine which permits use of a digital computer with a memory and associated program storage in place of the counter and gating circuitry characteristic of prior art approaches especially as disclosed in the prior co-pending application mentioned herein, and in the Quinn et al. Pat. No. 3,762,907.

SUMMARY OF INVENTION

Accordingly, a chief aim of the present invention is to provide an improved control system for a glassware forming machine including a digital computer with a suitable storage or memory, and with suitable access registers for both storing values of parameters associated with the dynamic glassware forming machine system, and also for comparing these values not only with actual data in the form of a binary coded signal indicative of glass gob feeder operation, but also with the capability for setting predetermined values of certain primary or boundary event timings, and for revising such settings in connection with preprogrammed ranges of changes to these event timing such that the overall cycle of operation of the glassware machine can be optimized from a thermodynamic point of view.

DETAILED DESCRIPTION

Figure 1:
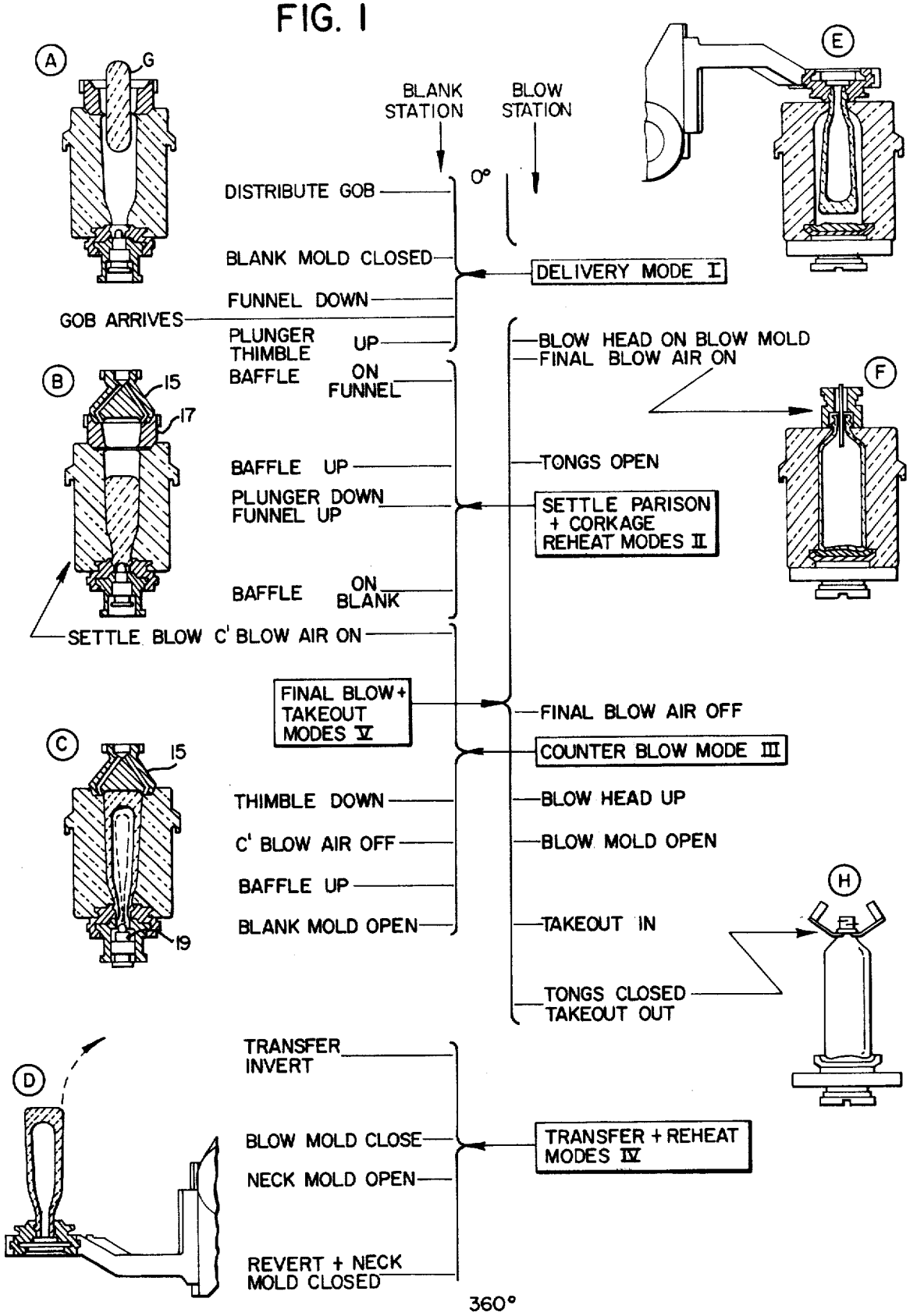
FIG. 1 is a schematic break-down of the typical glassware forming machine cycle, but with the modes of a typical cycle delineated in accordance with the boundary concept and embodied in the present invention.

Turning now to the drawings in greater detail, FIG. 1 shows a typical glassware forming machine cycle wherein various means or mechanisms are operated in sequence in a particular section of such a machine. The cycle is divided into several modes defined by certain event timings within each section cycle. In a typical I. S. type of glassware forming machine each such section includes a blank station and a blow station, which stations include mechanisms which are operated in timed relationship to one another as depicted schematically in FIG. 1. All of the various sections are adapted to receive gobs of molten glass, such as that depicted at G in FIG. 1, and a conventional feeder 24 is driven by a mechanical drive, as represented schematically in FIG. 2 by reference numeral 28. Instead of mechanically synchronizing the I. S. machine with the feeder the synchronization is achieved through the system to be described. An essential element of the system comprises a transducer device 26 which provides a continuous signal related to feeder operation.

Figure 2:
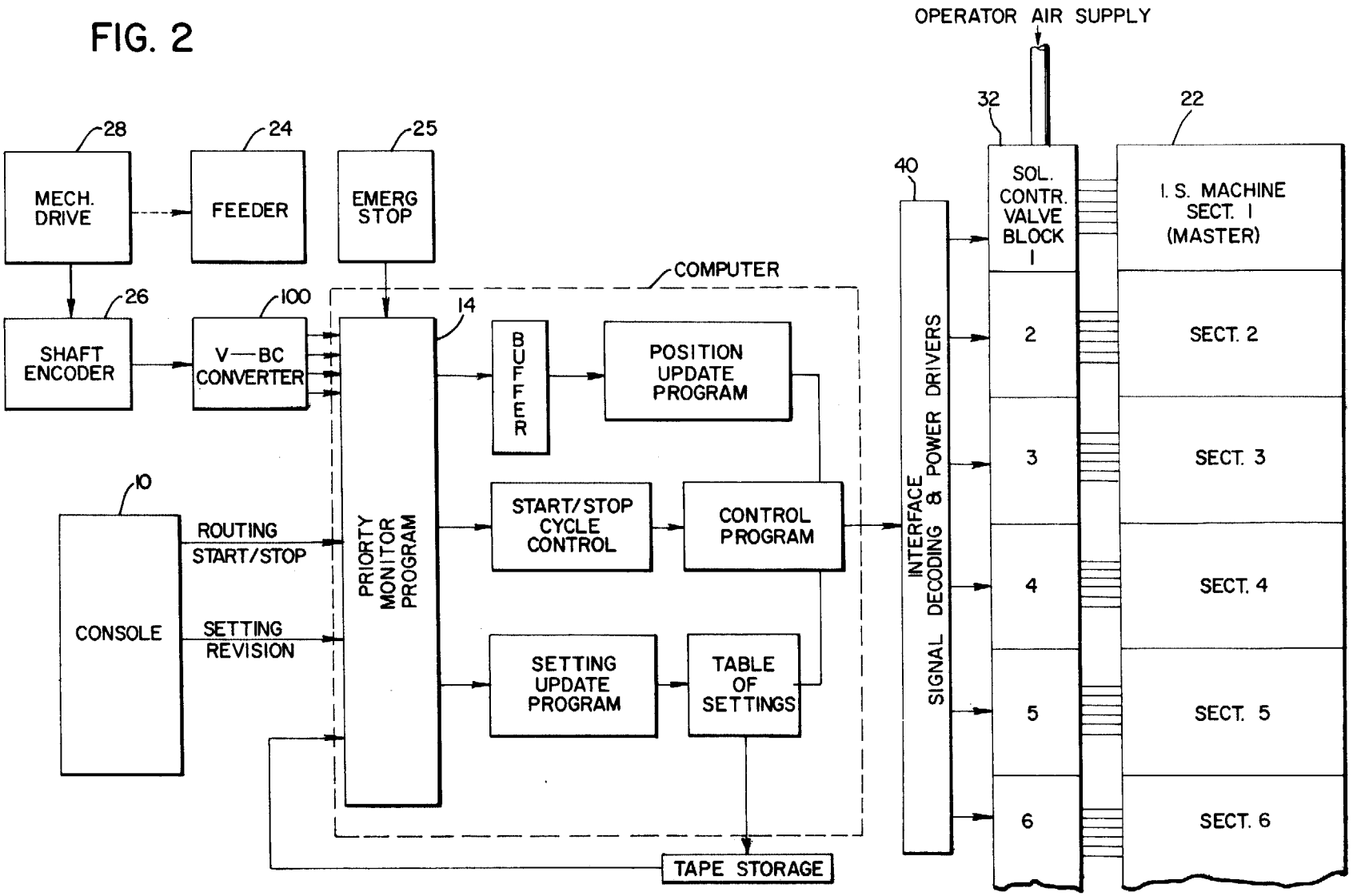
FIG. 2 is a block concept diagram of a preferred system incorporating the boundary concept of FIG. 1, and also incorporating the elements of the present invention.

Such a device is indicated at 26 in FIG. 2, and it is an important feature of the present invention that this device comprises a transducer of the type commonly referred to as a shaft encoder 26. More particularly, this shaft encoder, or position indicator, is geared down with respect to the drive of the feeder so that on a typical eight section machine for example, one rotation of the position indicating shaft corresponds to eight revolutions of the shear cam associated with the feeder. Therefore, one rotation of the position indicator shaft corresponds to one complete cycle of all the various sections of an eight section machine. Thus, the feeder cycle is the cycle from one cutting of a gob for a given section to the next cutting for that particular section. The shaft encoder 26 provides an output signal or voltage which is then fed to a converter 100 for reducing the continuous output voltage signal to a binary coded decimal (BCD) form suitable for processing in a conventional digital computer such as the General Purpose Computer Model No. PDP-11/10 sold by Digital Equipment Corporation of Maynard, Massachusetts.

Figure 9:
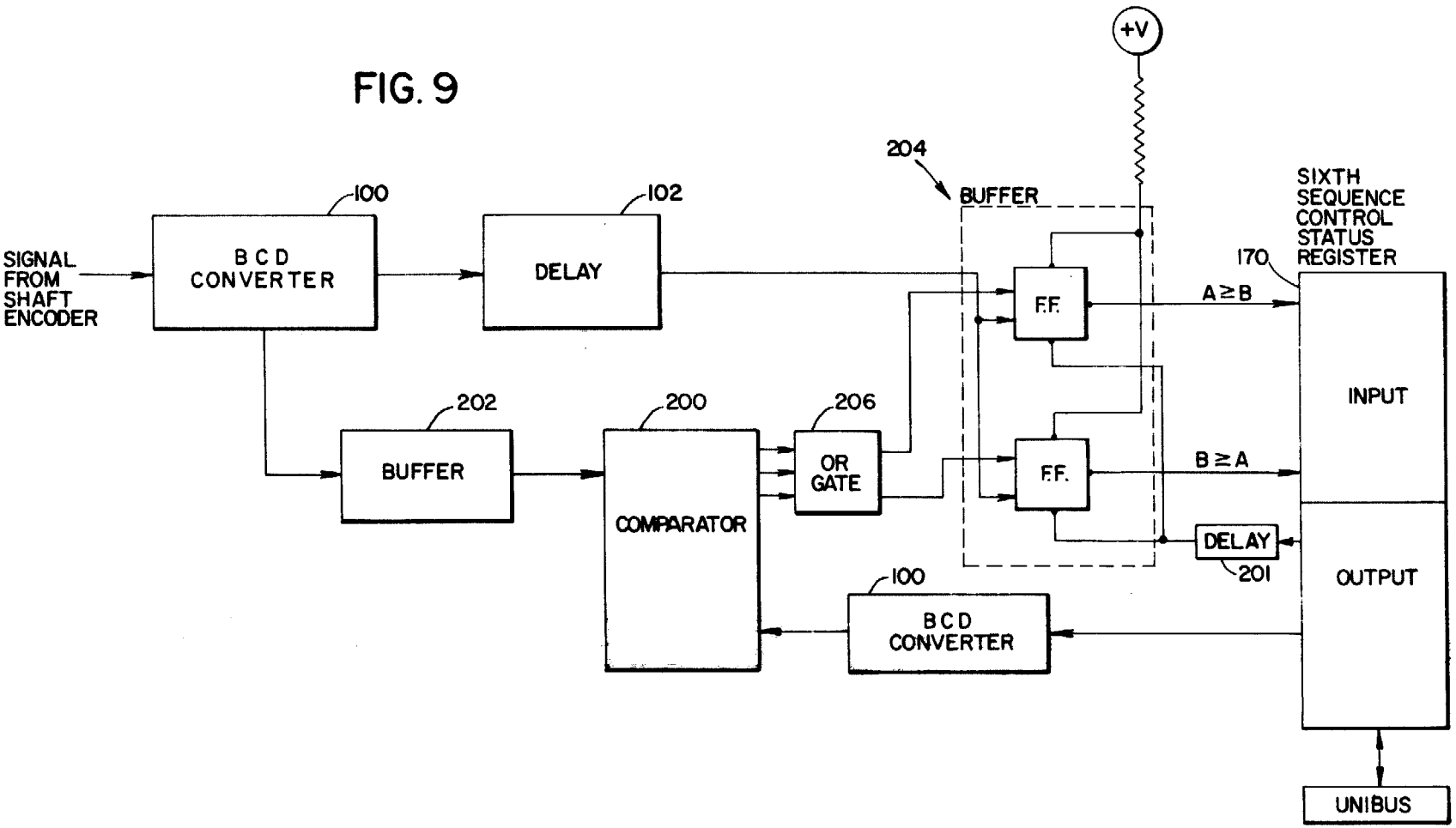
FIG. 9 is a functional block diagram of the logic circuitry required to process the output of the shaft encoder of FIG. 2 in the digital computer portion of the system of FIG. 2.

More particularly, and as shown in FIG. 9, the shaft encoder signal is converted to a binary coded decimal form in the device 100, and in this BCD form is compared by device 200 with a second binary coded decimal signal from the computer. The results of the comparison are for less than, equal to, or greater than, condition in the comparison of the encoder value with that from the computer. These results are logic OR'ed by device 206 to produce two signals, one indicating a less than or equal to, and the other greater than or equal to condition. Device 102 introduces a delay between the time of incidence of the BCD signal from the encoder and the putting of the less than or equal to and greater than or equal to signal into flip flops indicated as device 204 in FIG. 9. When the computer has acknowledged receipt of these signals it presents another value to device 100 and produces a reset signal to the flips flops in device 204 which is held for a fixed interval of time by delay device 201. The acknowledgement of the less than or equal to and greater than or equal to signals is done within the framework of a priority program depicted schematically at 14 in FIG. 2. Note that, emergency stop means 25 is provided with a higher priority than that associated with the shaft encoder 26 for reasons to be discussed hereinbelow.

Figure 3:
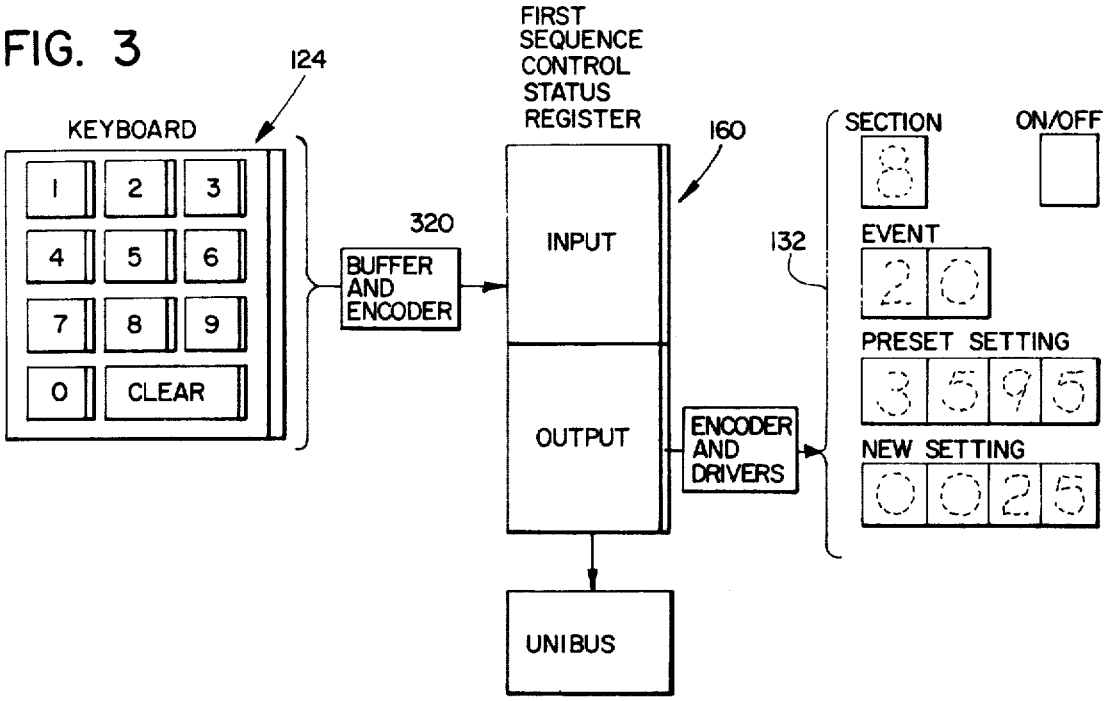
FIG. 3 is a functional block diagram of a portion of the system depicted schematically in FIG. 2, but showing certain elements in greater detail.
Figure 4:
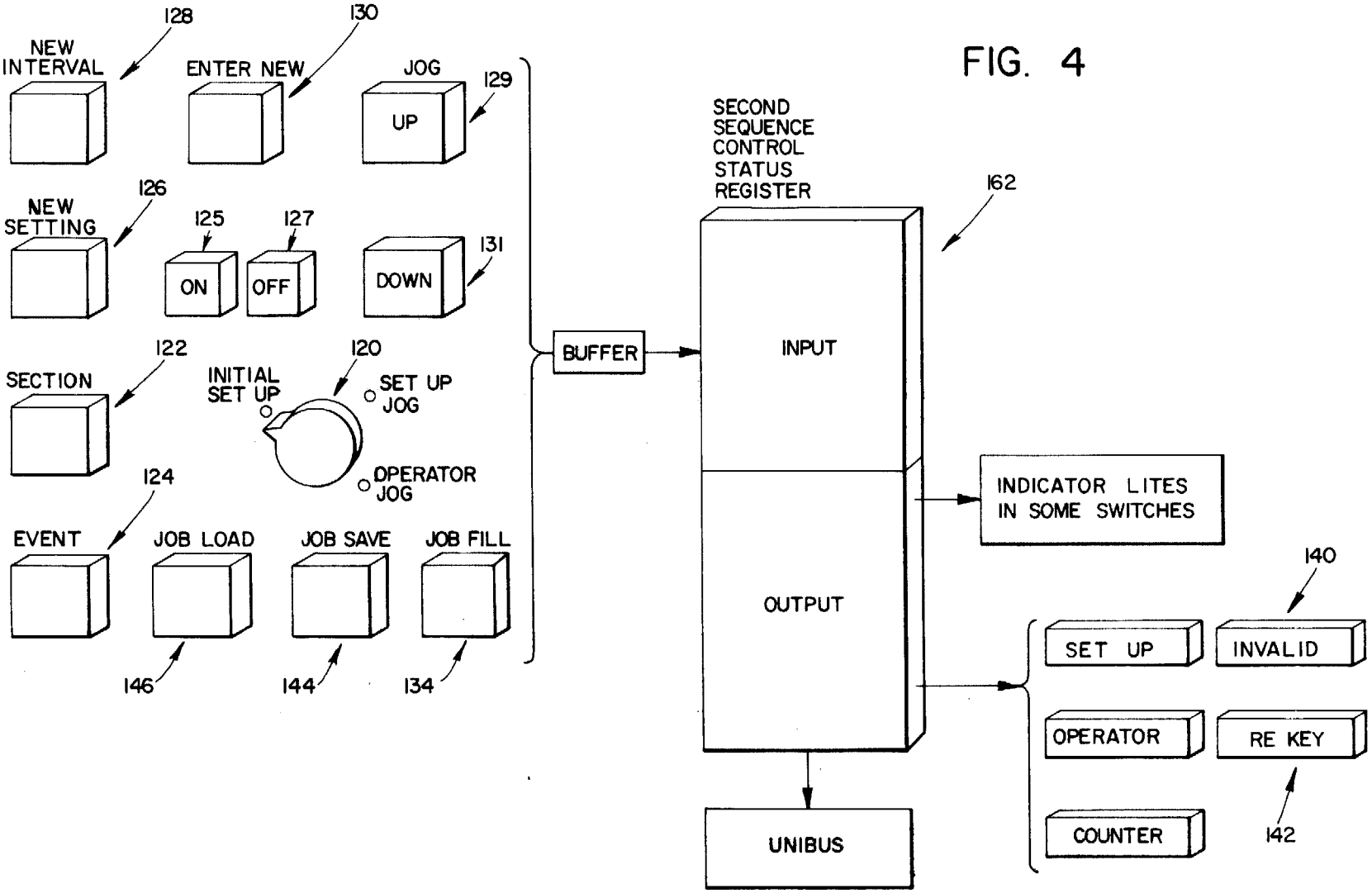
FIG. 4 is a functional block diagram of a portion of the system shown in FIG. 2 but with certain elements depicted in greater detail.

Other inputs to the priority monitor program 14 are provided from the console 10 in the form of start/stop inputs, and also in the form of new settings for initial set-up of the machine, or in the form of revisions to programming settings already stored in the computer. More particularly, FIG. 3 shows a portion of the console 10 as comprising a sequence control panel including a numeric keyboard 124. After selecting a particular machine section, as well as a particular machine function or event, by means of other selection switches on this panel a setting associated with this section and event can be selected between 0° and 360° with a resolution of ½° or 0.5° as depicted at the right-hand side of FIG. 3. FIG. 4 shows the other portion of the sequence control panel required for selecting the appropriate section and event, and it will be apparent that the operator initially selects "initial set-up" position on selector switch 120, following which the operator presses "section" push button 122 to permit use of the keyboard 124 of FIG. 3 in order to select a particular section as for example section 8 in FIG. 3. Pressing "event" push button 123 in FIG. 4 permits the keyboard to be used to select a particular event, as for example event 20, in FIG. 3. If no timing program has been previously stored in the computer, the operator will then be obligated to select a setting for each of the various event timings depicted in FIG. 1 and others by means of the push button switches 125, 126, 127 and 130. In like manner he should also select "interval" by depressing push buttons 122, 123, 128, and use the keyboard 124 and push button switch 130 to limit the changes to certain event settings which will be permitted. This need only be accomplished with respect to certain event timings, depicted in FIG. 1 as those event timings defining the several modes indicated by the brackets shown. The "enter new" push button 130 is adapted to actually enter new selections from the keyboard 124, the results being read out on the NIXIE displays 132, and also being fed to the computer by means of the UNIBUS as indicated in FIG. 3.

In addition to the capability of programming the timing of the 30 events, associated with opening and closing valves for operation of the various mechanical means or mechanisms in each section of the glassware machine and providing interval limits, two further settings are provided for each section. The first of these is the called section "off-set" and relates to the synchronizing of the various sections with respect to one another. The "firing order" of the machine is determined by these relative off-sets settings, and the angular value of said off-set settings is determined by the actual position of the feeder at the zero point for this section. The zero point in the feeder cycle at which an event setting equal to 360° occurs. The actual feeder position at which an event in that particular section occurs is therefore equal to the section off-set setting added to that event setting. Since all of the settings in the section setting storage are measured from the section zero point, a specific event will have roughly the same setting on all of the sections. That is, assuming that all of the various sections are in fact making a glassware article of the same configuration. The section off-set setting then takes care of delaying the timing for the individual sections by an appropriate amount so that the correct firing order is established. Therefore, once one section has been set-up as described above, the operator need only press the "job fill" push button 134 in FIG. 4 to provide synchronized operation of all of the sections with one another, and in accordance with the settings for the various events entered in the computer by means of the procedure set forth above.

Figure 5:
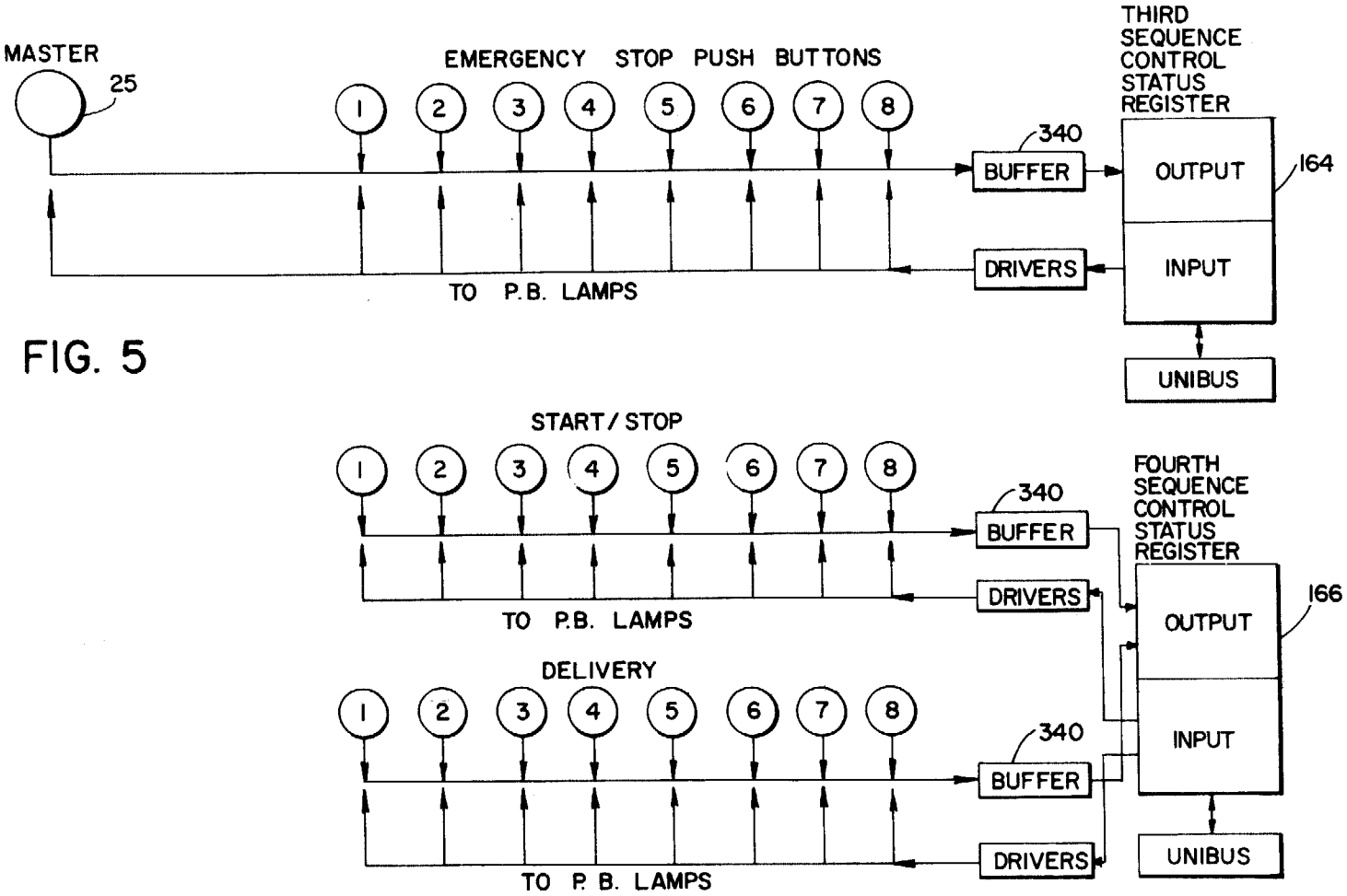
FIG. 5 is a functional block diagram of a portion of the system shown in FIG. 2 but with certain elements depicted in greater detail.

A second additional setting or event can be referred to as the start/stop angle. The "start/stop angle" is the point in the section cycle, that is the angular displacement with reference to the zero point, at which the individual section is either started in response to the depressing of an associated push button as depicted at 150 in FIG. 5, or at which said section is stopped in response to pressing of said push button. Thus, the operator may press these stop or start buttons, labeled 1–8 in FIG. 5, at any point in the cycle, and that particular section will start or stop when it reaches a predetermined position in its cycle. The delivery push buttons 152 also provided on the console 10 and these switches relate to the feeder, and more particularly to the gob distribution device utilized with the feeder, to direct one or more gobs of glass to the various machine sections. Finally, and still with reference to FIG. 5 the emergency, or "master stop" push button 25 illustrates the unit 25 also depicted in FIG. 2. This push button is provided on the console but it may be duplicated at various points on the machine itself, and in addition, individual section emergency stop buttons are also provided to completely interrupt the operation of the individual section of the machine. These push buttons are to be distinquished from the start/stop angle push buttons 150 referred to hereinabove, the latter requiring programmed information from the computer in order to assure that the machine is either started or stopped at a predetermined angular position for each particular section. However, it should be noted, that the emergency stop push buttons are given access to the computer via the UNIBUS as shown in FIG. 5, and therefore it is possible to provide a program for storage in the computer in order to assure that the blank and blow molds are moved to their open positions in response to closing of one or more of the emergency stop switches.

Once the machine, has been set-up as described above, and is operating so as to form glassware articles, means is provided for manually varying only the setting of selected event timings. To accomplish this the operator rotates selector switch 120 to "operator jog" for the purpose of either increasing or decreasing the angular setting of a selected event timing by means of the "up" or "down" jog push bottons shown in FIG. 4. This can be done within predetermined limits preset by means of the interval buttons 128 and keyboard as described above. It should perhaps be noted that even in set-up mode on switch 120, that these up and down push buttons can be used instead of the keyboard buttons if this approach is more convenient.

If the operator exceeds a predetermined interval limit, while operating in the operator jog mode, and "invalid" indicator light 140 will be illuminated to advise the operator that he has made an invalid selection attempt, and that such change has not been made. An indicator light labeled "rekey" indicates that an entry was missed and must be reentered. Once a particular job has been set-up and operating the operator can press the job save push button 144 in order to provide a permanent record of the event settings for any selected section, which permanent record can be used subsequently to enter these settings "in toto" at a later date in an automatic fashion. In such a case, the record is re-inserted in the computer's memory by means of a job load push button 146. This permanent record is preferably in the form of a computer tape, which tape is convenient form for such a record, and is a conventional component of computer peripheral equipment adapted to being interfaced with the conventional computer hardware of the present invention and hence need not be described in detail herein.

Referring next to the preferred digital computer utilized in carrying out the present invention, the above mentioned General Purpose Computer available from Digital Equipment Corporation is presently preferred. Access to this computer is achieved by means of conventional input/output status registers also sold by the above mentioned supplier under Model No. DR11, and an 8,000 bit memory provides the necessary storage for the above mentioned General Purpose Computer PDP-11/10. Six status registers are utilized, and are interfaced with the computer and the memory, by means of the UNIBUS referred to previously. The UNIBUS comprises conventional components including cables and buffering, and is also available from the same supplier. Each of these status registers has its own basic address configuration that is determined by jumper wires on the logic module. Within this basic address, three registers are addressable. The registers are depicted schematically in FIGS. 3, 4, 5 and 6 at 160, 162, 164, 166, 168 and 170. These status registers will be described in greater detail hereinbelow, but each has an associated priority level achieved through the use of jumper wires on the logic module in order to carry out the programs depicted schematically in FIG. 2 and in order to carry out the boundary concept depicted schematically in FIG. 1. More particularly the register 164 associated with the master stop button will have the highest priority level, and the next succeeding priority level will be allotted to the status register associated with the shaft encoder signal 170 and its associated BCD converter. The priority of all other registers will be lower than the emergency stop and the shaft encoder inputs.

Turning next to a consideration of the cycle in a typical glassware forming machine section with reference to the so-called blow and blow process of the type commonly used to form so-called "narrow neck" glassware. FIG. 1 shows the various event timings within a typical section cycle, which event timings are timed in accordance with the general concept disclosed in the prior co-pending commonly assigned patent application generally, and more specifically in accordance with the invention disclosed herein.

For purposes of illustration in FIG. 1 the starting point of the cycle is assumed to be, at least approximately, the point in time at which the gob G is formed at the feeder 24, but it will of course be apparent that the time of the various sections in the machine, all of which sections are serviced by a common feeder, will necessarily require that the gob arrive at each of these sections at a slightly different time. Therefore, the angular positions to be referred to with reference to the various modes of operation of this particular machine section are predicated on the assumption that this section is located in close proximity to the feeder, and that the gob G arrives at the blank station of this particular machine section sooner than would be the case with respect to other sections of the machine located more remotely from said feeder. However, and as mentioned hereinabove, each of these sections is timed with respect to the feeder in order to account for such variations.

The first event timing in the delivery Mode I occurs at approximately 15° and will typically enable a scoop below the feeder bowl to receive the gob and direct the gob through appropriate fixed troughs, so that it arrives at the blank station as indicated schematically in FIG. 1A. Although not shown, a succeeding timing merely ends the enable period and this timing occurs at approximately 55° (15° + 40°). Still within the delivery mode, the second event timing shown in FIG. 1 involves moving the blank mold toward its closed position, and this occurs at approximately 40° (15°+ 25°). The funnel 17 is then moved down onto the closed blank mold at 55° (15° + 40°) event timing number three. Finally, and still with reference to the delivery mode the plunger and thimble combination are moved up into the position shown in FIGS. 1A and 1B at approximately 60° (15° + 45°) event timing number four. All of the foregoing event timings are conveniently tied to the enabling of the scoop for delivery of the gob, event timing number one, and as indicated by the angular relationships set forth in this paragraph. Each of these event timings is adapted to be preprogrammed in the computer of the present invention for facilitating alterations to these timings for this delivery mode, directly in response to selected changes to the first event timing of the enabling of the scoop. Thus, enabling the scoop comprises a boundary, or primary event timing, which can be varied, but which itself determines the associated timing of each of the auxiliary events referred to in this paragraph.

The next mode of operation of the machine section can be characterized as a combination of settling the parison at the blank station and of corkage reheat. Once again a plurality of event timings are timed with respect to the boundary, or primary event timing, adopted for this combination mode. The boundary or primary event timing selected for this group, Mode II, comprises the time at which the plunger is moved down to the position shown at FIG. 1C. In a typical blow and blow cycle this event timing is caused to occur at approximately 105°. The baffle 15 is moved in on top of the funnel 17, as depicted at B in FIG. 1, at 70° (105° − 35°), event timing number one of Mode II. The baffle is then moved up off the funnel at 100° (105° − 5°), event timing two of Mode II. It should perhaps be noted that the air for settling the parison is turned on and off directly in response to movement of the baffle on and off the funnel respectively, and therefore, the solenoid valve which controls movement of the baffle controls via the baffle motions the turning on and off of the settle blow air and hence no separate event need be programmed therefore, The funnel 17 moves up away from the blank mold at substantially the same time as the boundary or primary event namely movement of the plunger down at 105°, event timing three of Mode II. Next, the baffle 15 is moved down onto the closed blank as shown at C in FIG. 1 and this occurs at 125° (105° + 20°) event timing four of Mode II.

Mode III of the glassware machine section cycle can be characterized as a counter blow mode, and the opening of the blank mold at approximately 260° is utilized as the boundary or primary event timing for the event timings grouped in this mode. The first event timing in Mode III is the turning on of the counter blow air at approximately 130° (260° − 130°). The thimble 19 in FIG. 1C moves down at 225° (260° − 35°), event timing two of Mode III and the counter blow air is turned off at 230° (260° − 30°) event timing three of Mode III. Finally, the baffle 15 moves up away from the blank mold at approximately 240° (260° − 20°) event timing four of Mode III. The opening of the blank mode at approximately 250° comprises event timing five of Mode III, but also constitutes the primary, or boundary event timing for Mode III.

The next succeeding Mode IV within the cycle of the glassware forming machine section comprises the transfer, or invert reheat mode in combination with the final blow mode, and the various event timings grouped in this combination mode are timed with reference to the transfer or invert action of the neck ring arm at approximately 300° event timing one of Mode IV. The blow molds are moved closed at approximately 320° (300° + 20°), event timing two of Mode IV. The invert cylinder under the control of solenoid valve in the valve block, is turned off at 335° (300° + 35°), event timing three of Mode IV and a revert cylinder returns the ring arm to the blank side at 355° (300° + 55°), event timing five of Mode IV. The revert cylinder is turned off at 210° (300° − 90°). The neck ring molds are opened at approximately 345° (300° + 45°), event timing four of Mode IV. These neck rings are only opened long enough to deposite the partially formed article at the blow station, and hence are reclosed at 355° (300° + 55°) event timing six of Mode IV.

The several events within the final blow and take-out mode of operation of the machine section, Mode V, are timed with respect to a boundary event timing comprising movement of the take-out arm from a first position wherein the finished article is picked up, as shown at H in FIG. 1, to a second position for depositing a newly formed ware on the deadplate (not shown) where it is pushed out onto a take-away conveyor or the like. This movement of the take-out arm from the blow station to the take-away conveyor occurs at approximately 285° event timing seven of Mode V. The first event timing Mode V comprises moving the blow head, shown in FIG. 1 at F, down onto the closed blow mold segments. This event timing occurs at approximately 60° (285° − 225°). The second event timing within Mode V closely follows the first, and involves turning the final blow air on at 80° (285° − 205°). The third event timing of Mode V, opening the tongs, which ultimately remove the final formed article from the blow station, occurs at approximately 100° (285° − 185°). The final blow air is turned off as event timing four of Mode V at approximately 210° (285° − 75°). This action is followed closely by moving the final blow head up off the blow mold halves at 230° (285° − 55°), event timing five of Mode V.

Still with reference to Mode V, event timing six comprises opening the blow mold segments, or halves, and this occurs at approximately 235° (285° − 50°). Event timing seven of Mode V comprises moving the take-out arm, with its associated tongs now opened, into the final blow station at approximately 255°. This event timing comprises the "boundary" for Mode V. Finally, Mode V has an eighth event timing involving two mechanical mechanisms, closing of the take-out tongs, and also movement of the take-out arm from the blow station toward the take-away conveyor and associated cooling deadplate (not shown). This eighth event timing occurs at approximately 290° (285° + 5°) still within Mode V of the cycle, and still under the preprogrammed control of the preceding boundary event, number seven.

Turning next to a more specific description of the comparator means for continuously comparing the indicator shaft position signal to a programmed value stored in the memory of the digital computer, FIG. 9 shows the voltage signal from the transducer, or shaft encoder unit 26, translated into digital form by converter 100 so as to be conveniently handled by digital devices such as those used in a conventional digital computer. The output from converter 100 is in binary coded decimal form, and is fed through an electronic latch 202 to the comparator 200. The programmed value for shaft position from the computer memory is converted to binary coded decimal form, and fed to the comparator 200 as shown in FIG. 9 so that the output from the comparator 200, in conjunction with OR gate 206, provides a first signal when the shaft position sensed is equal to or greater than the value from the computer, and a second signal when the shaft position sensed is equal to or less than its programmed value. An electronic latch or buffer 204 stores the output from the comparator, after a desired delay time through delay circuits to allow for settling of the signals 102, and then feeds such signal to the computer for processing in accordance with the program discussed previously. The OR gate circuit 206 is provided to convert the 3 signals equal to, greater than, and less than, comparator outputs to 2 signals the equal to greater than and the equal to and less than signals prior to the buffer 204. Buffer 204 is cleared when the computer updates the programmed shaft position through the BCD converter 100 via delay device 201.

Figure 6:
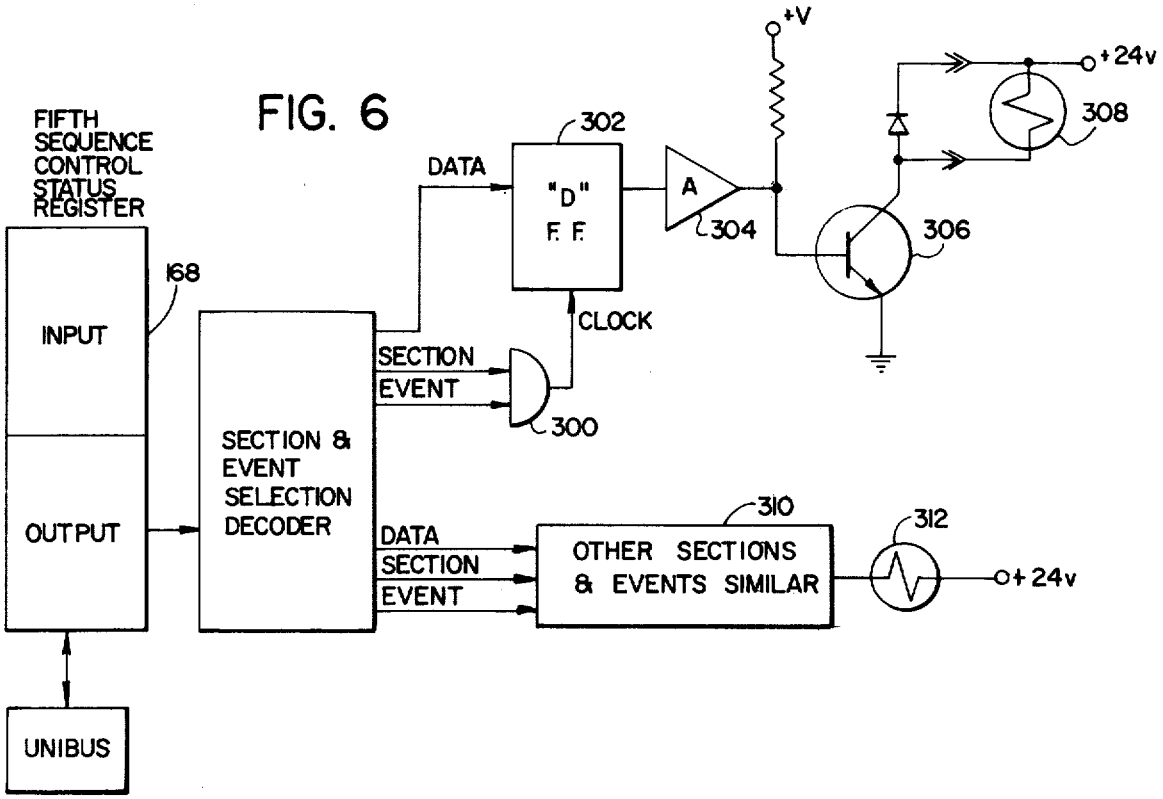
FIG. 6 is a detailed view of the logic circuitry associated with the interface and signal decoding provided between the computer portion of the system and the solenoid coils associated with operating the valves in the valve block of each of the various sections.

The computer output decoding and solenoid driver logic is depicted in FIG. 6. Driver flip flop 302 receives its clock input from AND gate 300, that is when the appropriate event and section number occur, then the state bit from the computer program (i.e. on or off) sets flip flop 302 and the output is amplified by the device 304 to switch transistor 306 on, and energize solenoid 308, opening or closing an associated valve in one of the several valve blocks 32 of FIG. 2. Other events within each section, and other sections are similarly interfaced with the valve block as shown at 310, and each solenoid valve is operated under the control of a solenoid such as shown at 312.

Figure 7:
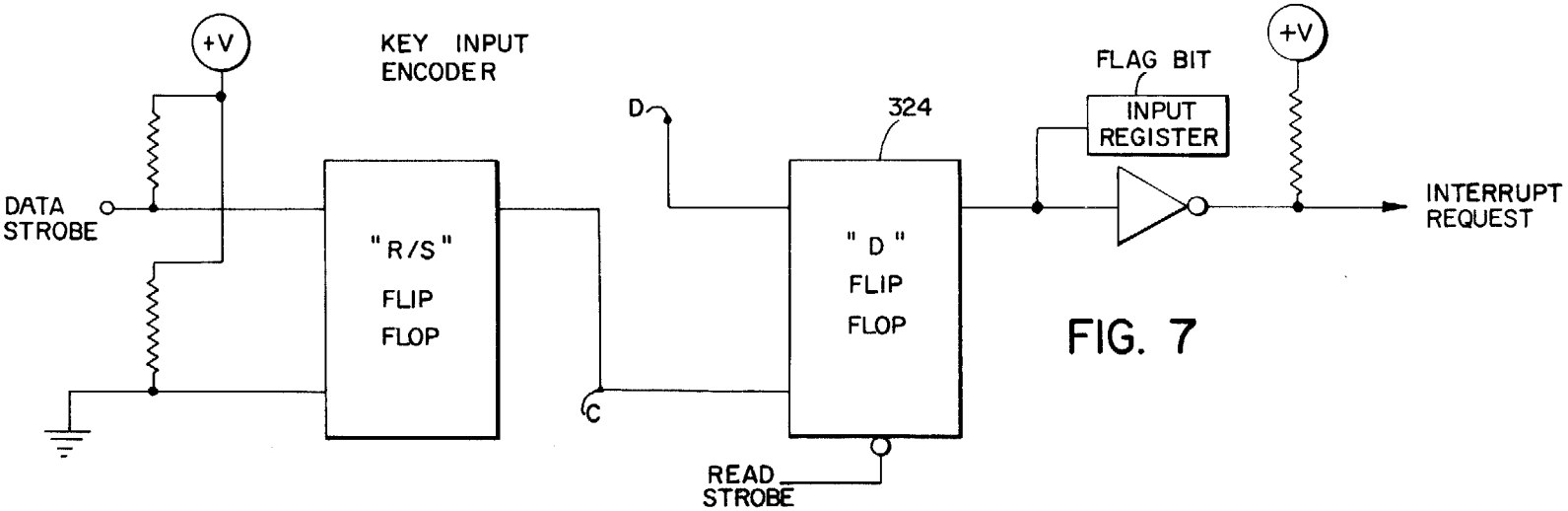
FIG. 7 is a detailed view of the logic associated with the encoder provided between the keyboard portion of the console and the first sequence control status register of FIG. 3.
Figure 8:
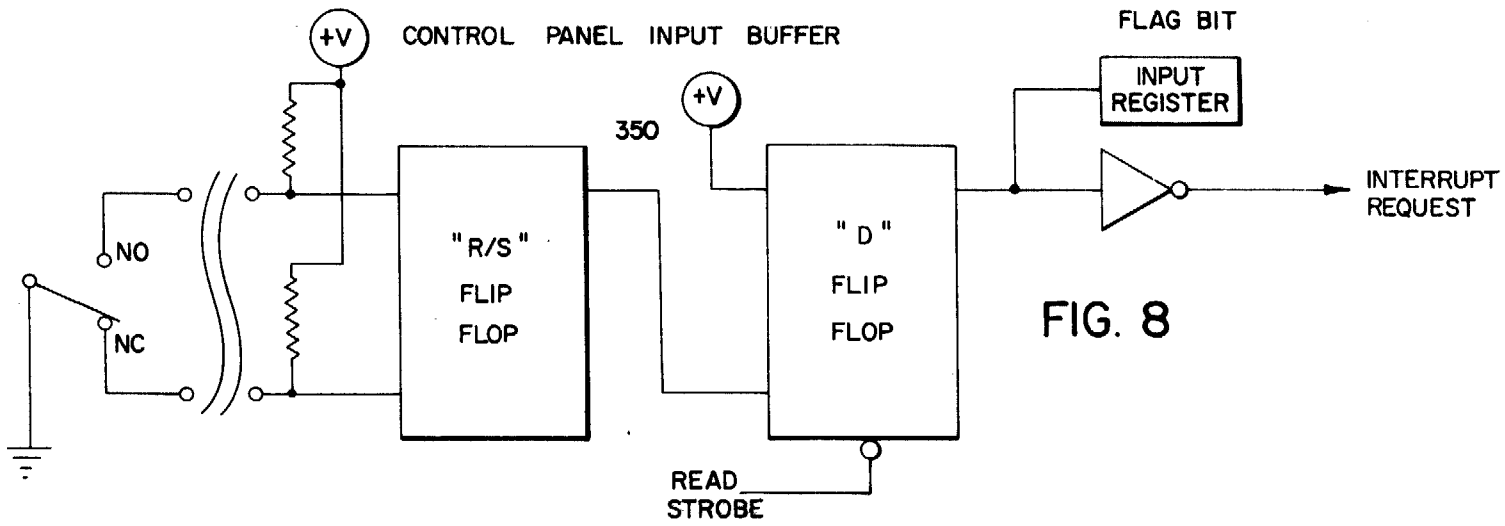
FIG. 8 is a detailed view of the logic associated with the buffer provided between the switches of FIG. 4 and the second sequence control status register of that view.

The buffering devices depicted schematically in FIGS. 3, 4 and 5 between the selector switches and the input status registers of these views are shown in greater detail in FIGS. 7 and 8. FIG. 7 shows the encoder 320 of FIG. 3 in some detail as comprising a typical normally open switch which is adapted to be momentarily closed by depressing a key on the keyboard 124. The R/S flip flop provides anti-bounce capability. The encoded input signal C is used to strobe data D into the "D" type flip flop 324. State bit D is one of the signals of the encoded keyboard character. These coded characters are then transferred to the computer through the input side of status register 160.

The buffers 340 of FIGS. 4 and 5 associated with the two position switches shown are depicted in FIG. 8. The R/S flip flop changes state with the switch and hence filters out contact bounce. Each time that R/S flip flop sets (e. g. when the switch is activated) the D flip flop is clocked set and an interrupt request is generated. The D flip flop output is connected to the input side of the associated status register. When this register is read by the computer the contents of the D flip flop is gated to the computer and the D flip flop is cleared. The switches of FIG. 4 are read only to the extent that each is actually activated. The start/stop and delivery switches are similarly read. The current status of the emergency stop switches are adapted to be read, by use of the flag bit in identifying the particular switch involved. Thus, instead of the flag bit being taken as shown in FIG. 8 for the emergency stop switches, the flag bit is taken directly from the output of the R/S flip flop itself, (e. g. at 350 in FIG. 8). Therefore this signal is cleared only when the associated switch is reset.

I claim:

1. In a multi-section glassware forming machine, each of which sections includes at least the following mechanical means:

a. means for delivering gobs of molten glass to a blank station in the machine section at a rate which can be varied, b. a blank mold operable to and from an active position at the blank station, c. a split neck ring mold operable between open and closed positions and cooperating with the blank mold to define a parison cavity at the blank station, d. means for settling the gob into the neck mold at said blank station, and a plunger operable to and from an active position at the blank station, e. secondary parison mold defining means operable to and from an active position at said blank station, and cooperating with said blank mold to define said parison cavity, f. transfer means for moving said split neck molds and the parison formed in said cavity out of said blank station and into a blow station, g. a split blow mold operable between open and closed positions at said blow station, h. means for final forming the parison at said blow station, i. take-out means for removing the final blown article from said blow station, said machine being further characterized by the improvement comprising:

j. drive means for said gob delivery means, and including a position indicator shaft so geared to said drive means as to make one revolution between delivery of succeeding gobs to said blank station associated with one of said individual machine sections, k. [ electromechanical transducer ] means *including a shaft encoder* driven by said position indicator shaft , [ for generating a variable electrical output voltage indicative of the angular position of the said shaft, ]

l. [ converter ] *said last mentioned* means [ for said transducer output voltage to generate ] *generating* a coded digital signal indicative of the instantaneous position of said shaft in binary [ coded decimal ] form, m. digital computer means including accessible memory means, n. comparator means for continuously comparing said digital shaft position signal to a preprogrammed value stored in said computer memory means in order to provide a first signal when said shaft position is equal to or greater than its programmed value and providing a second signal when said shaft position is equal to or less than its programmed value, o. said computer memory means including means for storing a programmed value of said shaft position corresponding to a desired sequence in event timing of the operation of each of said mechanical mechanisms, p. manually operable means by which the machine operator can select other values of shaft position for certain boundary [even] *event* timings, other event timings being preprogrammed to occur at predetermined shaft displacement therefrom [, and said manually operable means being permitted only during a succeeding cycle of operation of the machine, and only when the value so selected is within a predetermined interval also preprogrammed in said digital computer means] .

2. The improvement defined in claim 1 wherein said digitial computer means further includes storage means for recording values of said shaft position corresponding to the desired sequence in timing of the operation of said mechanical mechanisms for all of said machine sections whereby the timing of said sections with respect to one another can be achieved by a section offset program stored in said digital computer (that is by a single off-set event setting for that particular section).

3. The improvement defined in claim 1 wherein said manually operable means comprises a keyboard with at least 10 push button switches, a rotary switch having a set-up position to provide the operator with access to said computer memory whereby he can enter said preprogrammed shaft positions reflecting a desired sequence of events.

4. The improvement defined in claim 3 wherein said manually operable means includes switch means for selectively activating said keyboard to render it functional for so entering said preprogrammed shaft positions for all of said events at least when said rotary switch is in its set-up position.

5. The improvement defined in claim 4 wherein said switch means further includes facility for selecting individual sections within said machine, and also for transferring said programmed shaft positions from a selected intital set-up one of said sections to other of said individual sections.

6. The improvement defined in claim 4 wherein said switch means further includes facility for selectively activating said keyboard to render it functional for use in entering predetermined intervals between said certain boundary event timings at least when said rotary switch is in its set-up position.

7. The improvement defined in claim 3 wherein said *manually operable means is permitted only during a succeeding cycle of operation of the machine, and only when the value so selected is within a predetermined interval also preprogrammed in said digital computer means, and wherein said* rotary switch also includes a jog position, and alternatively useable up and down manual switches for incrementally varying said certain boundary event timings within said preprogrammed interval values when said rotary switch is in its jog position.

8. The improvement defined in claim 7 wherein said manually operable means includes switch means for selectively activating said up and down switches to render these functional for incrementally varying said preprogrammed intervals between said boundary event timings.

9. The improvement defined in claim 3 further including a peripheral program permanent storage medium for said sequence of programmed shaft positions (event timings) [, and peripheral input means for said periphery stored sequence event timings whereby the machine operator can store data relative to a particular job and reinstate such a programmed sequence of event timings directly from such permanent storage medium] .

*10. The improvement defined in claim 7 further including a peripheral program permanent storage medium for said sequence of programmed shaft positions (event timings), and peripheral input means for said periphery stored sequence event timings whereby the machine oerator can store data relative to a particular job and reinstate such a programmed sequence of event timings directly from such permanent storage medium.*

* * * * *

UNITED STATES PATENT OFFICE
CERTIFICATE OF CORRECTION

Patent No. Re. 29,188 Dated April 19, 1977

Inventor(s) William J. Croughwell

It is certified that error appears in the above-identified patent and that said Letters Patent are hereby corrected as shown below:

Col. 3, line 17, "stabilze" should be --stabilize--.

Col. 10, line 1, after "therefore" delete "," and insert --.--.

Col. 10, line 41, "deposite" should be --deposit--.

Col. 14, line 7, "intital" should be --initial--.

Col. 14, lines 45 and 46, "oerator" should be --operator--.

Signed and Sealed this

*twelfth* Day of *July 1977*

[SEAL]

*Attest:*

RUTH C. MASON
*Attesting Officer*

C. MARSHALL DANN
*Commissioner of Patents and Trademarks*